(12) United States Patent
Günther et al.

(10) Patent No.: US 6,612,646 B1
(45) Date of Patent: Sep. 2, 2003

(54) SUPPORT AND PNEUMATIC PRESSURE ACCUMULATOR FOR A VEHICLE SEAT

(75) Inventors: Ewald Günther, Böblingen (DE); Timothy Wynne-Jones, Rickmansworth (GB); Rudolf Krist, Ludwigsburg (DE); Bernd Schmidt, Wildberg (DE); Ralf-Henning Schrom, Rottenburg (DE); Petros Velimvassakis, Karlsruhe (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/519,919

(22) Filed: Mar. 7, 2000

(30) Foreign Application Priority Data

Mar. 8, 1999 (DE) .......................... 199 10 082

(51) Int. Cl.⁷ ................................ B60N 2/42
(52) U.S. Cl. ................... 297/216.1; 297/284.6; 280/730.2
(58) Field of Search ................... 297/216.11, 216.1, 297/216.12, 216.13, 284.6, 284.9; 280/730.1, 730.2; 5/713, 654

(56) References Cited

U.S. PATENT DOCUMENTS

| | | | | |
|---|---|---|---|---|
| 4,491,364 A | * | 1/1985 | Hattori et al. | 297/284.6 |
| 4,592,588 A | * | 6/1986 | Isono et al. | 297/284.6 |
| 4,615,563 A | * | 10/1986 | Kobayashi | 297/284.6 |
| 4,720,146 A | * | 1/1988 | Mawbey et al. | 297/284.6 X |
| 4,722,550 A | | 2/1988 | Imaoka et al. | |
| 4,789,202 A | * | 12/1988 | Alter | 297/284.6 |
| 5,135,282 A | * | 8/1992 | Pappers | 297/284.6 X |
| 5,542,691 A | * | 8/1996 | Marjanski et al. | 280/730.2 X |
| 5,547,214 A | * | 8/1996 | Zimmerman, II et al. | 280/730.1 |
| 5,556,127 A | * | 9/1996 | Hurford et al. | 280/730.2 |
| 5,588,671 A | * | 12/1996 | Boumarafi et al. | 280/730.2 |
| 5,651,582 A | * | 7/1997 | Nakano | 280/730.2 X |
| 5,667,242 A | * | 9/1997 | Slack et al. | 280/730.2 |
| 5,707,109 A | | 1/1998 | Massara et al. | |
| 5,845,966 A | * | 12/1998 | Severinski et al. | 280/730.2 X |
| 5,882,033 A | * | 3/1999 | Lachat | 280/730.2 X |
| 5,902,011 A | * | 5/1999 | Hand et al. | 297/284.6 |
| 5,951,039 A | * | 9/1999 | Severinski et al. | 280/730.2 |
| 6,273,810 B1 | * | 8/2001 | Rhodes, Jr. et al. | 5/654 X |

FOREIGN PATENT DOCUMENTS

| | | |
|---|---|---|
| EP | 0229737 | 7/1987 |
| EP | 229 737 B1 | 5/1991 |

* cited by examiner

*Primary Examiner*—Peter M. Cuomo
*Assistant Examiner*—Stephen Vu
(74) *Attorney, Agent, or Firm*—Crowell & Moring LLP

(57) ABSTRACT

A support for a vehicle seat, which support can be fastened to a supporting element of the seat and is used to support a cushion of the seat upholstery. The support is designed as a hollow body which provides a pneumatic pressure accumulator to which a pneumatic pressure source and at least one pneumatic consumer can be connected.

12 Claims, 1 Drawing Sheet

SUPPORT AND PNEUMATIC PRESSURE ACCUMULATOR FOR A VEHICLE SEAT

CROSS REFERENCE TO RELATED APPLICATION

Priority is claimed with respect to German Application No. 199 100 829-16 filed in Germany on Mar. 3, 1999, the disclosure of which is incorporated herein by reference.

BACKGROUND OF THE INVENTION

The invention relates to a support for a vehicle seat. The invention also relates to a vehicle seat which is fitted with such a support.

EP 0 229 737 B1 discloses a support of the type mentioned at the beginning, which is fastened to a supporting frame of a seat and there supports a lateral cushion of the seat upholstery. A support of this type improves the seat comfort of the seat. Moreover, in a support which is designed as a side support and which supports a side cushion of the seat, the lateral retention in the seat for the particular occupant is improved and, as a result, the vehicles safety is increased.

The known support has a flap which is hinged-mounted on the support, and an inflatable chamber which is arranged between the support and this flap and which is fastened on the support. The flap can be actuated by the air pressure in this chamber, and the seat cushion which is supported on the flap can be adjusted as a result. By adjusting the cushion in this manner, the upholstery of the seat can be adapted to the requirements of the particular occupant.

SUMMARY OF THE INVENTION

The present invention is concerned with the problem of specifying a particularly expedient embodiment for a support and for a seat of the type mentioned at the beginning.

According to the invention, this problem is solved by use of a support member as a pneumatic pressure accumulator this gives the support a dual function enabling the space occupied in the seat by the support to be suitably put to an additional use. The proposal according to the invention makes it possible, for example, for a pneumatic system which is present in the vehicle to be expanded by the pneumatic pressure accumulator according to the invention, so that overall a larger accumulator volume is available for the said pneumatic system. Also, with such a pneumatic system another pressure accumulator can be replaced or reduced in size, so that an optimization of the pneumatic system is made possible in this regard too.

An example of the pneumatic consumers which may be connected to the pneumatic pressure accumulator formed by the support are pneumatically operating driving elements of a central locking system of the vehicle. It is particularly advantageous if the seat has upholstery which can be adjusted by means of inflatable chambers and if these chambers which form the pneumatic consumers are connected to the pneumatic pressure accumulator formed by the support. In this matter, the pneumatic consumers and pneumatic pressure accumulator are situated in local proximity to one another, so that long hose lines which are susceptible to possible leakage and have complicated hose routing can be omitted. This advantage is particularly apparent if on the actual support according to the invention there is mounted at least one inflatable chamber which is connected to the pneumatic pressure accumulator integrated in the support and which can be actuated in order to adjust the cushion to be supported by the support.

According to a preferred embodiment, the support according to the invention can be fastened in the region of an armrest of the seat and is used there to support a side cushion of the seat upholstery. In this region, the pneumatic pressure accumulator which is formed by the support is crash-protected and, for example, also security-relevant pneumatic consumers, such as, for example, a pneumatically actuated central locking system, can be supplied with the required compressed air.

The problem on which the invention is based is also solved by a seat which forms a compact subassembly on account of the dual function integrated in the support(s).

Further important features and advantages of the invention emerge from the subclaims, from the drawings and from the accompanying description of the figures with reference to the drawings.

It goes without saying that the features mentioned above and the features still to be explained below can be used not only in the combination indicated in each case, but also in other combinations or on their own, without departing from the scope of the present invention.

A preferred exemplary embodiment of the invention is illustrated in the drawings and is explained in more detail in the description which follows.

BRIEF DESCRIPTION OF THE DRAWING

In the drawings, in each case schematically.

DETAILED DESCRIPTION OF THE PREFERRED EMBODIMENT

Figure 1:
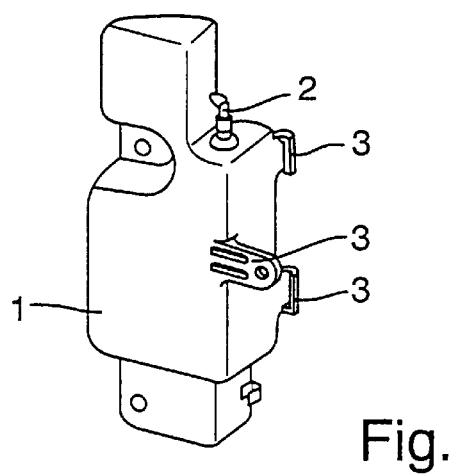
FIG. 1 shows a perspective view of a support according to the invention.

According to FIG. 1, a support according to the invention has an external contour adapted to installation conditions predetermined for a seat. According to the invention, the support 1 is designed as a hollow body which is configured in such a manner that it can be used as a pneumatic pressure source. For this purpose, the support 1 is produced from an appropriate material, for example plastic, having a sufficient wall thickness and suitable reinforcements. The support 1 has a connecting piece 2 via which a pneumatic pressure source and/or a pneumatic consumer can be connected to the pneumatic pressure accumulator formed by the support 1. Fastening elements 3 are expediently integrally formed on the support 1.

Figure 2:
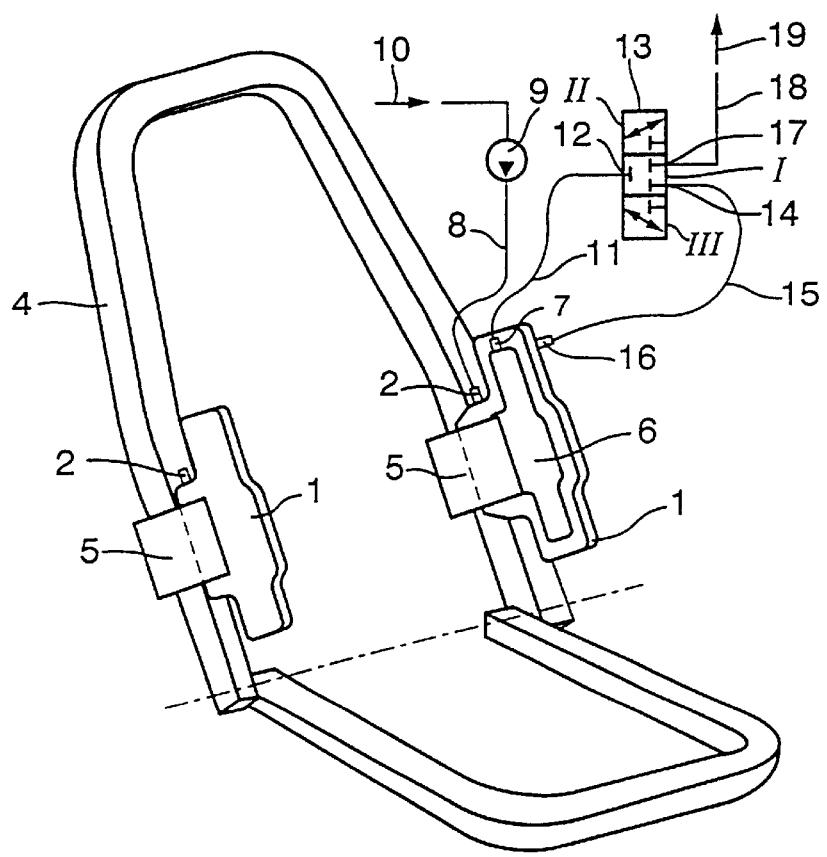
FIG. 2 shows a perspective view of supporting elements of a vehicle seat (which is otherwise not illustrated), which is fitted with two supports according to FIG. 1.

According to FIG. 2, the support 1 can be designed as a side support. Two such side supports 1 are, according to FIG. 2, fastened to a backrest-supporting frame 4 of a vehicle seat (which is not illustrated otherwise). In this case, the side supports 1 are each accommodated in the region of a side cushion (not illustrated) of the vehicle seat in a manner such that they lie opposite each other and symmetrically to each other and, as a result, cause this cushion to be supported laterally. The side supports 1 are fastened, in particular screwed, to the backrest-supporting frame 4 using retaining plates 5, for example. An inflatable chamber 6 is mounted on an outer side of the support 1, which outer side faces the cushion to be supported, the chamber changing its volume depending on its filling and on the air pressure prevailing in it, and thereby making it possible for the cushion supported by the support 1 to be adjusted. For this purpose, the chamber 6 has a connecting piece 7 through which the chamber 6 can be inflated and through which the air contained in the chamber 6 can escape out of the chamber 6.

According to FIG. 2, the pneumatic pressure accumulator formed by the support 1 is connected by its connecting piece 2 via a hose 8 to the delivery side of an air pump 9, which serves as the pneumatic pressure source and on the intake side takes in air from the surroundings, which is symbolized by an arrow 10. The connecting piece 7 of the chamber 6 is connected by a hose 11 to a first connection 12 of a valve 13. A second connection 14 of this valve 13 communicates via a hose 15 with a further connecting piece 16 of the pneumatic pressure accumulator integrated in the support 1. A third connection 17 of the valve 13 communicates via a line 18 with the surroundings, which is symbolized by an arrow 19.

Instead of the support 1 according to FIG. 2 which is fitted with two connecting pieces 2 and 16, a single connection to the pneumatic pressure accumulator formed in the support 1 may be sufficient, as long as a corresponding pneumatic circuit is used. The pneumatic circuit illustrated here is used merely for the simplified explanation of the functioning of a preferred embodiment.

The valve 13 can be actuated by a vehicle occupant, i.e. by a user of the vehicle seat fitted with the support 1 according to the invention. In the central position of the valve 13, which position is illustrated in FIG. 2 and is denoted by I, the three connections 12, 14, 17 of the valve 13 are blocked, so that air is unable to escape either out of the chamber 6 or out of the pneumatic pressure accumulator. If the valve 13 is moved in accordance with FIG. 2 downwards into a second switch position which is identified by II, the connections 12 and 17 of the valve 13 are connected to each other, while the connection 14 is blocked, so that the chamber 6 can communicate with the surroundings, as a result of which the air contained in the chamber 6 emerges into the surroundings. In this manner, the cushion to be supported by the support 1 is adjusted towards the support 1. If the valve 13 according to FIG. 2 is moved upwards into a third switch position identified by III, the connections 12 and 14 of the valve 13 are connected to each other, and the connection 17 is blocked, so that the pneumatic pressure accumulator can communicate with the chamber 6. If a sufficiently high air pressure prevails in the pneumatic pressure accumulator, air then flows from the pneumatic pressure accumulator into the chamber 6 and inflates the latter. As a result, the side cushion supported by the support 1 is moved away from the support 1.

The pneumatic pressure accumulator is filled via the pump 9 cyclically or depending on need. An appropriately orientated nonreturn valve is preferably integrated in the connecting piece 2.

What is claimed is:

1. A vehicle seat comprising a support member forming a hollow body operable as a pneumatic pressure accumulator;

wherein a pneumatic pressure source and at least one pneumatic consumer are connectable in fluid communication with the support member;

wherein the support member is fastened to a supporting element of the vehicle seat and supports a cushion of the vehicle seat; and wherein the at least one Pneumatic consumer comprises an inflatable chamber which is mountable on the support member and is connectable to the Pneumatic pressure accumulator formed by the support member for adjusting the cushion supported by the support member.

2. The support according to claim 1, wherein the support member is capable of being fastened in a region of an armrest of the vehicle seat and used to support a side cushion of a seat upholstery.

3. The support according to claim 2, wherein the support member is plastic.

4. The support according to claim 1, wherein the support member is capable of being fastened to a backrest-supporting frame of the vehicle seat.

5. The support according to claim 1, wherein the support is plastic.

6. A seat for a motor vehicle comprising:

a seat supporting element;

a support member operatively connected to the seat supporting element, the support member forming a hollow body operable as a pneumatic pressure accumulator; and a pneumatic pressure source and at least one pneumatic consumer coupled in fluid communication with the support member;

wherein the support member is arranged to support a cushion of the seat;and wherein the at least one pneumatic consumer comprises an inflatable chamber which is mountable on the support member and is connectable to the pneumatic pressure accumulator formed by the support member for adjusting the cushion supported by the support member.

7. The seat according to claim 6, wherein the support member is arranged in a region of an armrest of the seat and supports a side cushion of the seat.

8. The seat according to claims 7, wherein the at least one pneumatic consumer is an inflatable chamber which is arranged to adjust upholstery surrounding the side cushion of the seat.

9. The seat according to claim 8, wherein the inflatable chamber is arranged on the support member.

10. The seat according to claim 6, wherein the at least one pneumatic consumer is an inflatable chamber which is arranged to adjust upholstery surrounding the cushion of the seat.

11. The seat according to claim 10, wherein the inflatable chamber is arranged on the support member.

12. A support for a vehicle seat comprising:

a support member forming a hollow body operable as a pneumatic pressure accumulator;

wherein a pneumatic pressure source and at least one pneumatic consumer connectable in fluid communication with the support member; and wherein the support member is mountable to a supporting element of the vehicle seat for supporting a cushion of the vehicle seat; and wherein the at least one pneumatic consumer comprises an inflatable chamber which is mountable on the support member and is connectable to the pneumatic pressure accumulator formed by the support member for adjusting the cushion supported by the support member.

* * * * *